(No Model.) 3 Sheets—Sheet 2.

B. F. TEAL.
SPRING MOTOR.

No. 323,540. Patented Aug. 4, 1885.

Attest:
Cont. A. Cooper
H. E. Hansmann

B. Frank Teal,
Inventor:
By Foster & Freeman
Attorneys.

(No Model.) 3 Sheets—Sheet 3.

B. F. TEAL.
SPRING MOTOR.

No. 323,540. Patented Aug. 4, 1885.

Attest:
Court. A. Cooper.
H. C. Hansmann.

B. Frank Teal,
Inventor.
By Foster & Freeman
Attorneys.

UNITED STATES PATENT OFFICE.

B. FRANK TEAL, OF PHILADELPHIA, PENNSYLVANIA.

SPRING-MOTOR.

SPECIFICATION forming part of Letters Patent No. 323,540, dated August 4, 1885.

Application filed December 3, 1884. (No model.)

*To all whom it may concern:*

Be it known that I, B. FRANK TEAL, a citizen of the United States, residing at Philadelphia, in the county of Philadelphia and State of Pennsylvania, have invented certain new and useful Improvements in Spring-Motors, of which the following is a specification.

My invention relates to that class of spring-motors or spring-actuated mechanisms in which a coiled spring secured at one end to a shaft and at the other to a bearing upon the drum is the means of imparting motion to the shaft or drum; and my invention consists, mainly, in automatically adjusting the bearing for the spring, so as to increase the leverage in proportion as the power of the spring decreases, thereby securing a uniform action without the use of the ordinary regulating or compensating devices.

My invention further consists in certain details of the mechanism, hereinafter fully set forth, and illustrated in the accompanying drawings, in which—

Figure 1:
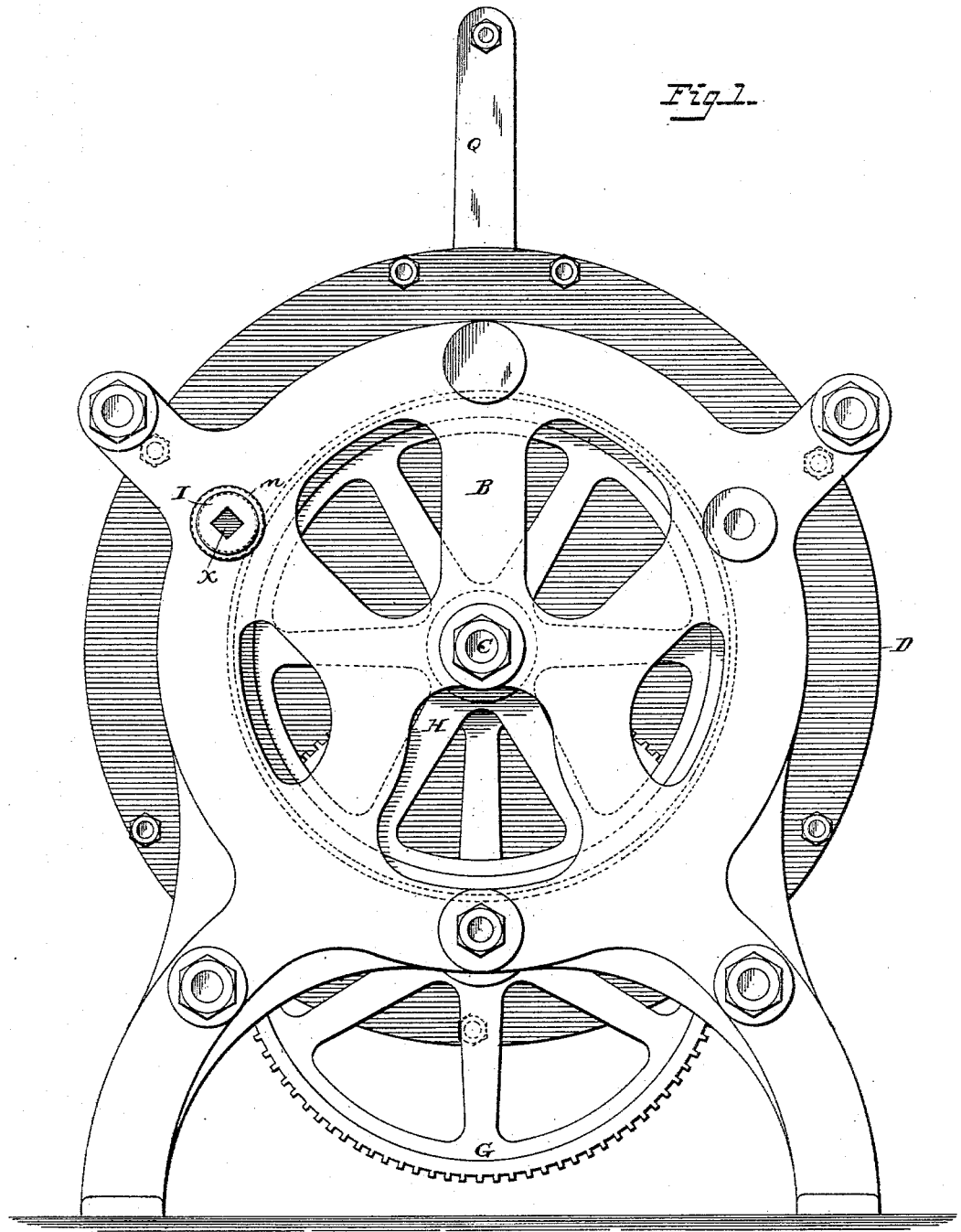
Figure 2:
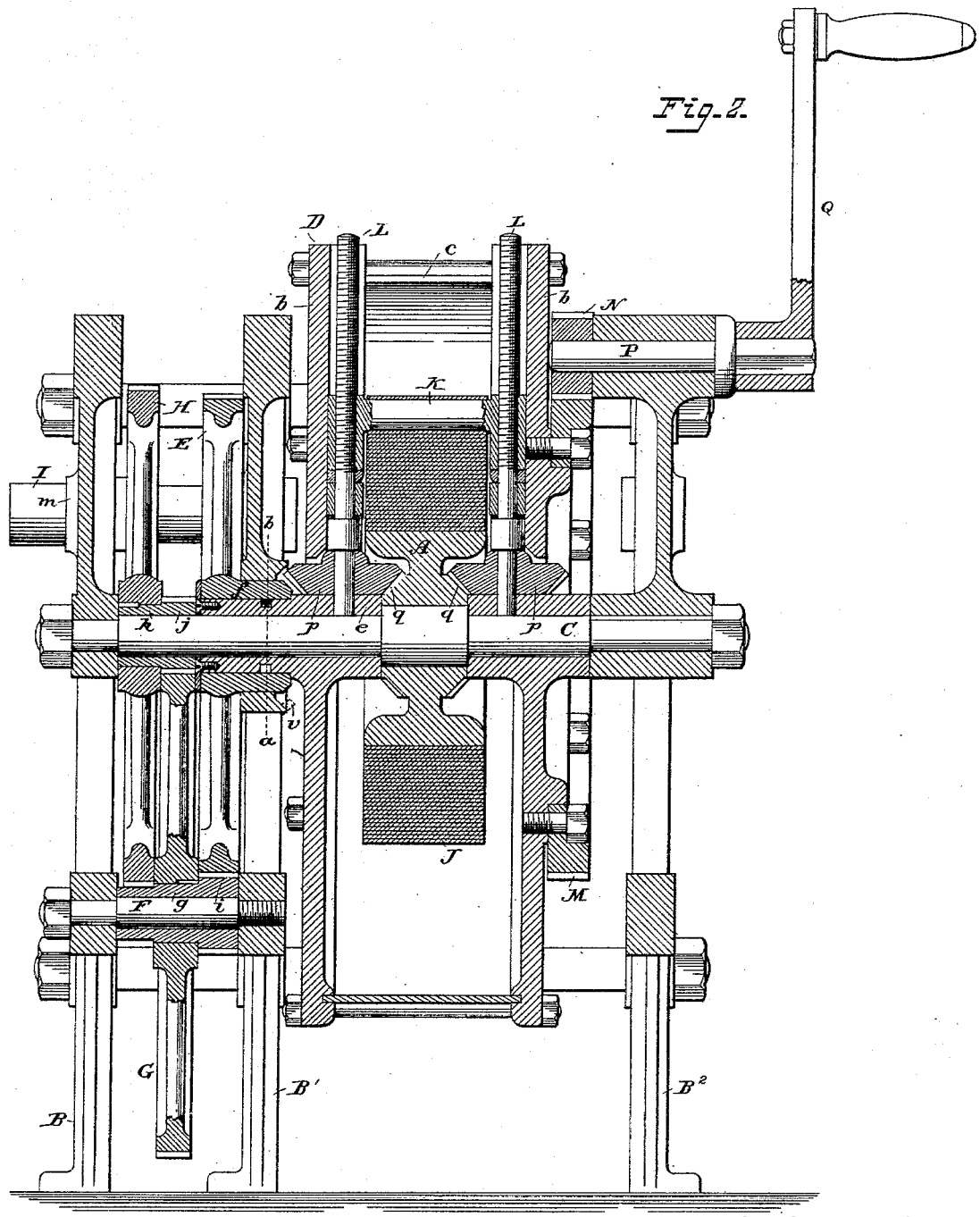
Figure 3:
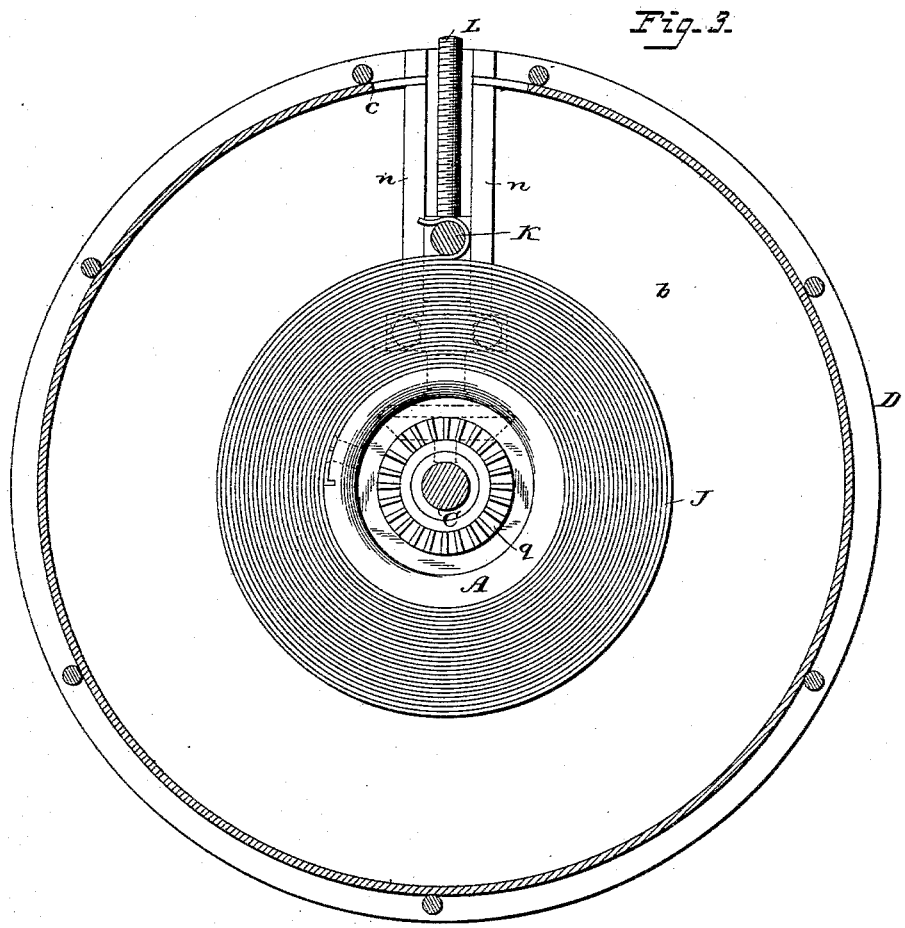
Figure 4:
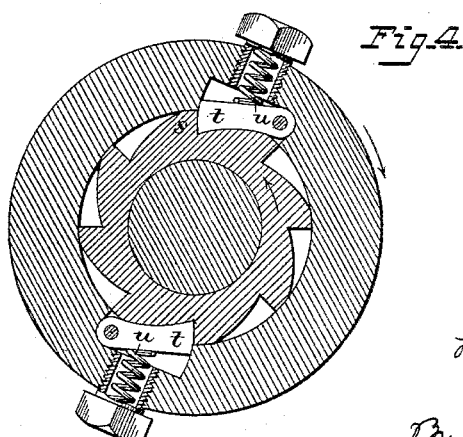

Figure 1 is a sectional elevation showing a spring-motor embodying my invention. Fig. 2 is a section on the line 1 2, Fig. 1. Fig. 3 is a side elevation. Fig. 4 is an enlarged section of the hub on the line 3 4, Fig. 1.

The frame of the machine, as shown in the drawings, consists of three housings, B B' B², connected by cross-bolts $a$, and centrally supporting the fixed shaft C of the spring-drum D. The drum is a hollow cylindrical case having sides $b\ b$, periphery $c$, and a hub, $e$, which projects at one side from the drum, and supports a gear-wheel, E, the hub $f$ of which turns in the bearing in the housing B'. A spindle, F, supported by the housings B B', supports a gear-wheel, G, carried by a steel sleeve, $g$, which projects from each side of the gear G, and is formed at one end into a pinion, $i$, which engages with the gear-wheel E, and a gear-wheel, H, is connected to a steel sleeve, $h$, which turns upon the shaft C, and is formed at the end into a pinion, $j$, which engages with the gear G. In bearings in the housings B B' turns a shaft, I, a pinion, $m$, upon which gears with the teeth of the gear-wheel H, the shaft having an angular socket, $x$, in the end for ready connection with the shaft of the machine to be driven. The gear-wheels and pinions described derive their motion from the rotation of the drum, the speed of the driving-shaft I being of course much greater than that of the drum, the arrangement described being compact, and the housings protecting the teeth of the gears.

By using steel sleeves to form the bearings for the large gears and to constitute the pinions, I secure increased durability and prevent the wear which would result from making the pinions and gears of the same metal, the gears being of brass or other metals softer than steel.

It is well known that in spring-motors as ordinarily constructed the power of the motor decreases in proportion as the spring uncoils, rendering it necessary to employ compensating or regulating appliances whenever a uniform action is desired. To avoid the necessity of using such auxiliary devices, I so connect the spring to the drum that the leverage will increase in proportion as the power decreases, thereby securing a uniform application of the power. Different modes of making this connection may be employed. Thus the coiled motor-spring J is secured at one end to a circular block, A, fastened to the shaft C, and at the other to a cross-bar or bearing, K, the ends of which extend between guides $n\ n$ at the inner sides of the sides $b$ of the drum, so that the cross-bar may be carried radially from the center as the spring uncoils, whereby the spring, when at its greatest tension, has its bearing upon the drum near the center thereof, and the said bearing is shifted toward the periphery of the drum, and the spring acts with greater leverage as its power decreases.

The means of shifting the bearing or cross-bar shown in the drawings are carrying screw-shafts L L, turning in bearings in the sides and hub of the drum, and having reversed screw-threads adapted to threaded openings in the enlarged ends of the cross-bar K, and these shafts are turned to carry the bar upward as the drum revolves by means of beveled gear-wheels $p$ upon the shafts, which engage with beveled gears $q$ upon the sides of the stationary block A, the pitch of the threads upon the screw-shafts being such that the movement of the bar K at each revolution of the drum is equal to the thickness of the blade of the spring. When the movement of the drum is reversed in winding up the machine, the screw-shafts will be turned in a reversed direction, and the cross-bar K will be carried inward in proportion as the spring is coiled.

As a convenient means of coiling the spring, I provide the drum at one side with a gear, M, engaging with a pinion, N, upon a shaft, P, turning in bearings of the housing $B^2$, and provided with a rectangular end for the reception of a handle, Q.

In order that the drum may be turned to coil the spring without a movement of the gears between the drum and the driving-shaft, I provide the hub $e$ with a series of teeth forming a ratchet, $s$, and I hang to the hub $f$ of the gear E one or more pawls, $t$, which engage with the said teeth when the drum revolves by the spring, but which slip over the teeth when the drum is turned by means of the handle to coil the spring.

I do not limit myself to the use of the means shown for driving the screw-shafts L L, as they might be turned in different ways, and might be operated intermittently instead of constantly. For instance, the gears $q\ q$ might be dispensed with, and the teeth of the gears $p$ might be brought at each revolution in contact with stationary projections V, which would thereby turn them a part of a revolution.

Instead of using screw-shafts for carrying radially the bar K, the ends of the latter might extend through the sides of the drum into spiral grooves in stationary disks supported by the housings B $B^2$.

Although I have shown a convenient and compact arrangement of reducing-gears, any other suitable arrangement of such gears may be used when the motion is to be increased or reduced.

It will be apparent that the varying adjustment of the spring bearing upon the drum is adapted for time-pieces and other spring-actuated mechanisms where it is desirable that the spring-power shall be made constant.

Without limiting myself to the precise construction and arrangement of parts shown, I claim—

1. In a spring-actuated mechanism, the combination of a revolving drum, and a coiled spring fixed at one end and secured at the other to a movable bearing upon the drum, operated positively substantially as set forth.

2. The combination of a revolving drum, coiled spring, a bearing connecting the outer end of the spring and drum and positively-operating devices, substantially as described, for carrying said bearings toward the periphery of the drum as the spring uncoils, for the purpose set forth.

3. The combination, in a motor, of a shaft, drum, coiled spring secured at one end of the shaft and at the other to a bearing upon the drum, and positively-operating devices, substantially as described, for carrying the bearing outward as the spring uncoils.

4. The combination of the shaft C, drum, carrying screw-shafts having reversed threads, cross-bar carried by said screw-shafts, and spring secured at the outer end to the said cross-bar, substantially as specified.

5. The combination of the shaft C, coiled spring, cross-bar carried by screw-shafts turning in bearings on the drum, and gears upon the screw-shafts engaging with gears upon the shaft C, substantially as set forth.

6. The combination, with the housings and shafts C F I, of the gears and pinions carried by the shafts C F, and drum carried by the shaft C, substantially as set forth.

7. The combination, with the shaft, of steel sleeves carrying the gears and projecting beyond the sides of the latter and formed into pinions, substantially as specified.

In testimony whereof I have signed my name to this specification in the presence of two subscribing witnesses.

B. FRANK TEAL.

Witnesses.
 W. A. MITCHELL,
 B. F. HART.